United States Patent [19]

Fuchs et al.

[11] Patent Number: 4,812,800
[45] Date of Patent: Mar. 14, 1989

[54] STRAIN GAGE HAVING A THIN DISCONTINUOUS METAL LAYER

[75] Inventors: Harald Fuchs, Gruenstadt; Herbert Gleiter, Saarbruecken; Stephan Trapp, Meschweiler; Juergen Petermann, Buxtehude, all of Fed. Rep. of Germany

[73] Assignee: Basf Aktiengesellschaft, Ludwigshafen, Fed. Rep. of Germany

[21] Appl. No.: 10,995

[22] Filed: Feb. 5, 1987

[30] Foreign Application Priority Data

Feb. 5, 1986 [DE] Fed. Rep. of Germany ....... 3603449

[51] Int. Cl.$^4$ ................................................ G01L 1/22
[52] U.S. Cl. ............................................. 338/2; 338/5
[58] Field of Search .................................. 338/2, 3, 4, 5

[56] References Cited

U.S. PATENT DOCUMENTS 2,556,132 6/1951 Ball ......................................... 338/2
2,621,276 12/1952 Howland ................................ 338/2

OTHER PUBLICATIONS

Strain Gauge Technology, A. L. Window and G. S. Holister, Applied Science Publishers, Ltd., Essex, England (1982), pp. 1–38.
Advances in Physics 24, 407–461 (1975), Abeles et al., "Structural and Electrical properties of Granular Films."
Advances in Physics 34, 475–512 (1963), Roberts et al., "An Applied Science of Langmuir-Blodgett Films."
Journal of Applied Physics, 34, No. 9, (2700–2708), Sep. 1963, Parker and Krinsky, "Electrical Resistance-Strain Characteristics of Thin Evaporated Metal Films."

Primary Examiner—E. A. Goldberg
Assistant Examiner—M. M. Lateef
Attorney, Agent, or Firm—Keil & Weinkauf

[57] ABSTRACT

A highly sensitive strain gage containing a thin discontinuous metal layer whose conduction effect is based predominantly on the tunnel effect and which is applied uniformly onto a thin, nonmetallic, dielectric or semiconducting substrate such as uniaxially oriented or partially crystalline plastic film, an ordered ultrathin layer or a silicone-coated plastic film, the diffusion processes in the applied metal layer being reduced and its structural stability improved as a result of interaction of the substrate with the metal layer.

10 Claims, 2 Drawing Sheets

STRAIN GAGE HAVING A THIN DISCONTINUOUS METAL LAYER

BACKGROUND OF THE INVENTION AND PRIOR ART

The present invention relates to highly sensitive strain gages having a thin discontinuous metal layer which changes its resistance with strain and has improved stability.

Strain gages as transducers for strain gages based on the physical effect of an electrical conductor changing its resistance under mechanical load, eg. strain, have long been known and are used, for example, for measuring strains in components as a result of static or dynamic loads. In conventional wire or foil strain gages, in general wire wound into a coil is embedded in plastic and is connected firmly to the object being investigated. Because of the linear coupling of strain and change in resistance, strains $\epsilon$ of less than $10^{-6}$ cannot be resolved. The relevant prior art includes, for example, U.S. Pat. Nos. 2,556,132 and 2,621,276 and the monograph Strain Gauge Technology by A.L. Window and G.S. Holister, Applied Science Publishers Ltd., Essex, England, 1982, particularly pages 1 to 39. Semiconductor strain gages have a higher sensitivity but have the disadvantage of greater temperature dependence.

However, in many fields, such as research into creep processes, inelastic deformation, phase transitions, geological deformation processes in rock or ice, etc., the measurement of strains $\epsilon$ of less than $10^{-6}$ is important.

Investigations into discontinuous metal layers on dielectrics, such as layers of gold, silver, palladium or tin on glass or quartz substrates, are known (cf. Advances in Physics 24 (1975), 407–461 and J. Appl. Phys. 34 (1963), 2700–2708. The disadvantage of the systems investigated is their structural instability due to diffusion-controlled aging processes in the discontinuous metal layers, which leads to a shift in the distribution of distances between the metallic islands of the layer toward larger distances. This results in a rapid increase in the electrical resistance of the discontinuous metal layers investigated, and finally to suppression of the tunnel currents in the discontinuous metal layer and to electrical insulation.

OBJECTS AND SUMMARY OF THE INVENTION

It is an object of the present invention to provide highly sensitive strain gages which are sufficiently stable over a period of time for measurements in industry.

We have found that this object is achieved by the production of strain gages in which the thin discontinuous metal layer is applied uniformly to a substrate which, as a result of interaction with the metal during and/or after application, greatly reduces diffusion in the discontinuous metal layer and thus reduces the structural instability, described above, of the said layer by shifting the distances between the metal islands.

The present invention therefore relates to strain gages of the type stated in the claims.

The thin, discontinuous metal layers used according to the invention for the strain gages are very thin layers of island-forming metals, such as gold, tin, zinc, indium, cadmium, antimony or selenium, as can be applied uniformly in a discontinuous layer, in particular by vapor deposition at above the melting point under greatly reduced pressure. The size of the metal clusters is in general no more than 200 Å, preferably about 30–50 Å. The mean thickness of the applied discontinuous metal layers is in general from 30 to 500 Å, in particular from 50 to 200 Å, and depends not only on the metal used but also on the advantageous resistance of the metal layer with regard to the specific intended use, the conduction mechanism of the said layer being based predominantly on the tunnel effect (tunnel current). Other known methods, such as cathode sputtering, electron beam vaporization or decomposition of an organometallic compound on the substrate, for example on a heated substrate, are also suitable for applying the metal layer. Electrolytic methods for depositing metals can also be used. It is also possible to mount pick-up electrodes in the same operation as application of the metal layer, although these electrodes are often mounted at a later stage prior to use.

An essential feature of the novel strain gages and their production is the application onto substrates which, as a result of interaction with the metal of the metal layer, greatly reduce the possible diffusion of the said metals. This can be effected by increasing the diffusion barriers or by producing a shielding film on the metallic phase. For example, we have found that the use of substrates having ordered structures or oriented or crystalline structural regions results in orientation in the deposited metal layer, this orientation greatly reducing its diffusion processes and increasing its structural stability. Thus, when thin uniaxially oriented plastic films, such as polyethylene, polypropylene or poly-1-butylene films, are used, tin, indium, zinc and cadmium are deposited epitactically by vapor deposition under greatly reduced pressure, and the resulting discontinuous metal layers exhibit greatly reduced diffusion processes and the desired structural stability. A similar situation is encountered in the case of vapor deposition of tin and indium with uniaxially oriented films of isotactic polystyrene. The crystallographic directions showing closest packing are parallel to the chain direction. The oriented substrate films are in particular from 25 to 1000 Å, preferably from 200 to 500 Å, thick.

Similarly, application of the metal layers to polymers having crystalline fractions, for example partially crystalline polydiacetylenes, polyethylene terephthalates or nylons, leads to interaction with the metal layers and reduced diffusion processes in these layers. The same applies when ordered ultrathin layers less than 0.1 μm thick are used as substrates, which can advantageously be applied directly to the specimens being measured, for example workpieces, by the Langmuir-Blodgett technique (cf. G.G. Roberts, Adv. Phys. 34(1985),475–512) or by liquid phase adsorption. Gas phase deposition (PVD, CVD) is also suitable here. The ultrathin films produced by the Langmuir-Blodgett technique may be prepared from, for example, salts, in particular barium, calcium or magnesium salts of stearic acid or palmitic acid or from diacetylene fatty acids. Such films, for example, of diacetylene fatty acids, may additionally be polymerized or cross-linked by radiation in order to increase their lateral stability.

The vapor deposition techniques permit imagewise structuring of the substrates or of the applied active metal layers. This makes it possible to produce specific patterns depending on the measurement problem.

Moreover, the microscopic extension of the conducting zones and of the insulating intermediate zones make it possible to produce very small detectors (<1 mm$^2$) in comparison with classical strain gages. If desired, a grid of such strain-sensitive sensors can be used to image crack distribution on solid surfaces. Brittle substrate films adhering firmly to the surface are preferably employed for this purpose, the said films transmitting small strains to the discontinuous metal layer.

For discontinuous layers of inert metals, in particular noble metals and preferably gold, other thin substrates which have proven useful are coated plastic films and in particular silicone-coated plastic films, such as polyethylene films, the silicone layer preferably being thinner than 10 $\mu$m and the substrate preferably thinner than 100 $\mu$m. Here, the diffusion in the discontinuous metal layer is probably greatly suppressed by producing a shielding film on the metallic phase.

Where the substrates are not applied directly to the specimens, they should be dimensionally stable (eg. brittle) and capable of transmitting even very small strains in the specimen to the discontinuous metal layer. Adequate adhesion to the specimens is advantageous, and this adhesion may also be produced by means of adhesives, for example epoxide adhesives or polyurethanes, or by means of adhesive tape.

In some cases, for example, for certain metals, eg. selenium, in the discontinuous metal layers, it is very advantageous to apply, for example by vapor deposition, a thin covering layer eg. an SiO layer or a paraffin layer, on top of the metal layer, the said covering layer also serving as protection against chemical effects, for example through oxygen or moisture. Frequently, too, the structural instability of the discontinuous metal layer of the strain gage can be further improved by such a covering layer.

The novel strain gages are distinguished by high sensitivity which is more than an order of magnitude greater than that of the conventional strain gages. After an initial aging period, they furthermore have good stability over a period of time with regard to the increase in the resistance of the strain gage. Compared with conventional strain gages, the measurement length can be reduced to 1 mm or less. They are not only simple to produce but can also be provided with pick-up electrodes in an equally simple, known manner and can be measured using conventional resistance meters.

BRIEF DESCRIPTION OF THE DRAWINGS

A preferred embodiment or "example" of the invention will now be described with reference to the accompanying drawings, in which.

DETAILED DESCRIPTION OF THE PREFERRED EMBODIMENT

EXAMPLE

Figures 1, 1A:
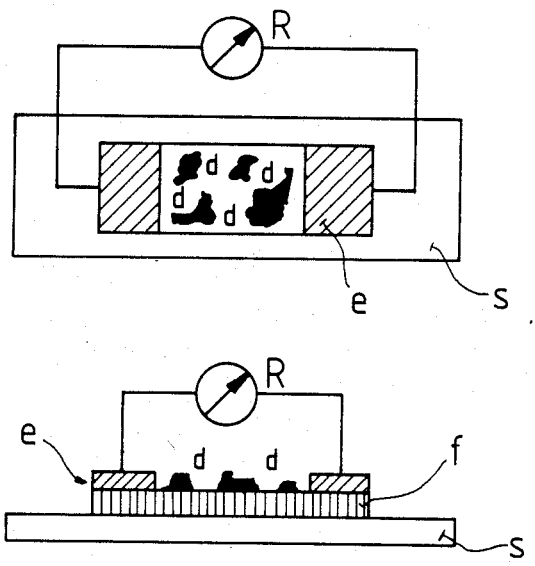
FIG. 1 is a plan view, partially in section, of a tunnel strain gage according to the invention.
FIG. 1A is a front view, partially in section of this tunnel strain gage.

The tunnel strain gages were produced by thermal vaporization of gold under a reduced pressure of $10^{-4}$ Pa. The substrate used was a silicone-coated high pressure polyethylene film, on which a discontinuous gold film having a means thickness of 13 nm was applied. The substrate was provided with pick-up electrodes about 2 $\mu$m thick in a first operation, a 0.5$\times$6 mm wide strip being produced between these electrodes with the aid of a mask. After removal of the mask, the actual sensor was produced in this strip, the resistance of the sensor being monitored continuously during the measurement. Vapor deposition was completed at a total resistance of 8 M$\Omega$, and the ready-prepared strain gage was adhesively bonded to the clean surface of a stainless steel bar (FIG. 1). The distance between the electrodes was 0.5 mm and the width of the film was 6 mm. In FIG. 1, f is the substrate, d the gold film applied by vapor deposition, e the pick-up electrodes, s the stainless steel substrate to be investigated and R the resistance meter.

Figure 2:
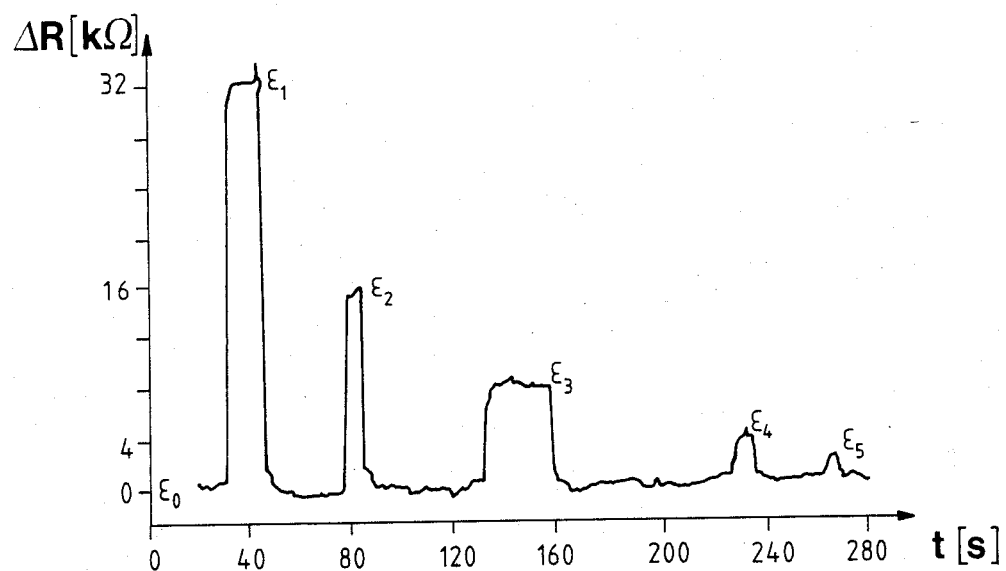
FIG. 2 is a chart showing the change in resistance $\Delta R$ (k$\Omega$) of the strain gage as a function of the time for which the various loads are applied.

The stainless steel bar with the adhesively bonded strain gage was incorporated in a four-point strain apparatus, and the relative changes in resistance $\Delta R/R$ for various strains ($\epsilon = \Delta l/l$) were determined. The strains were varied between $10^{-6}$ and $2 \cdot 10^{-5}$. FIG. 2 shows the change in resistance $\Delta R$ (k$\Omega$) of the strain gage as a function of the time for which the various loads were applied, the sharp peaks which occur in load states $\epsilon_1$ and $\epsilon_4$ being caused by vibrations when the loads were removed. The imposed strains were: $\epsilon_0 = 0$, $\epsilon_1 = 20.068 \times 10^{-6}$, $\epsilon_2 = 10.084 \times 10^{-6}$, $\epsilon_3 = 5.017 \times 10^{-6}$, $\epsilon_4 = 2.068 \times 10^{-6}$, $\epsilon_5 = 1.035 \times 10^{-6}$. When the values $\Delta R/R \times 10^{-4}$ were plotted against $\epsilon \times 10^{-6}$ as the resistance/strain characteristic, the resistance was found to change linearly in the strain range. The sensitivity $k = (\Delta R/R)/(\Delta L/L)$ of the strain gage is $125 \pm 10$, compared with a sensitivity of $k = 2$ for conventional strain gages.

The surface resistance of the strain gage changes reversibly in the temperature range between 253 and 293 K. The aging process, ie. the gradual changes in the resistance of the strain gage thus produced is complete within a few days under normal ambient conditions.

We claim:

1. A tunnel strain gage possessing a thin discontinuous metal layer which changes its electrical resistance with strain, wherein the said strain gage
    (a) contains a thin discontinuous metal layer whose conduction effect is based predominantly on the tunnel effect and which is
    (b) applied uniformly to a thin, nonmetallic, dielectric or semiconducting substrate, the diffusion processes in the applied metal layer being reduced by interaction between the substrate and the metal layer.

2. A strain gage as claimed in claim 1, which has a thin covering layer on top of the discontinuous metal layer.

3. A strain gage as claimed in claim 1, wherein the substrate is a silicone-coated plastic film.

4. A strain gage as claimed in claim 1, wherein the substrate is a uniaxially oriented plastic film.

5. A strain gage as claimed in claim 1, wherein the substrate is an ordered ultrathin layer which is less than 0.1 $\mu$m thick.

6. A strain gage as claimed in claim 1, wherein the substrate is a silicone-coated plastic film, and a thin covering layer is present on top of the discontinuous metal layer.

7. A strain gage as claimed in claim 1, wherein the substrate is a uniaxially oriented plastic film, and a thin covering layer is present on top of the discontinuous metal layer.

8. A strain gage as claimed in claim 1, wherein the substrate is a polymer containing crystalline components.

9. A strain gage as claimed in claim 1, wherein the metal of the discontinuous metal layer is gold.

10. A strain gage as claimed in claim 1, wherein the metal of the metal layer is selected from the group consisting of tin, zinc, indium, cadmium, antimony and selenium.

* * * * *